Nov. 12, 1935.  K. D. BITTLE  2,020,286
FLUID VALVE
Filed Oct. 5, 1932
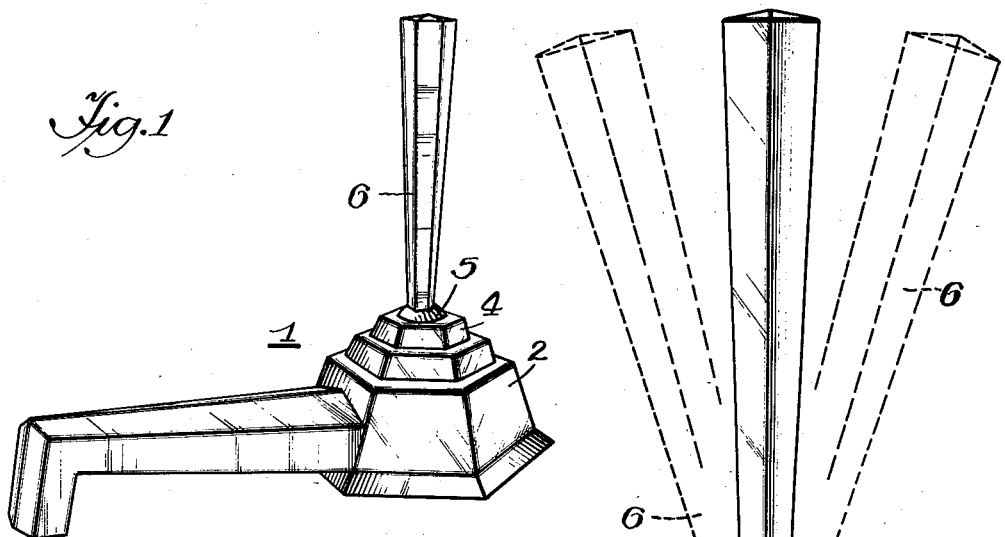
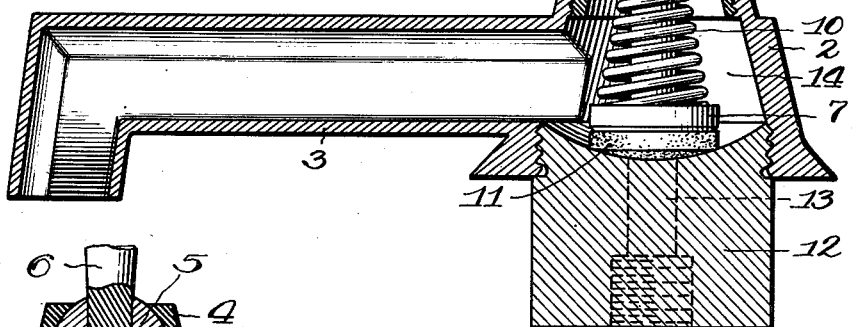
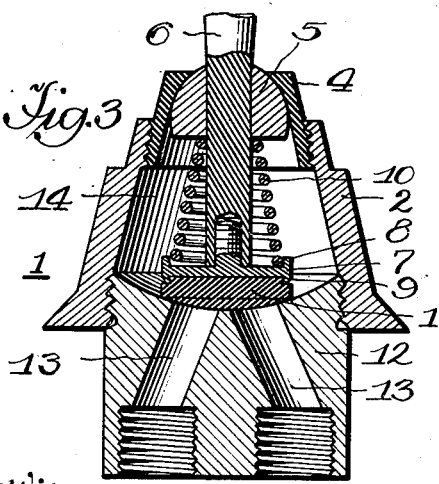
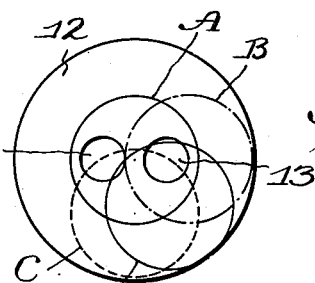
Inventor
Keith D. Bittle,
Parkinson Lane Atty
Witness:
Chas. C. Koursh.

UNITED STATES PATENT OFFICE 2,020,286

FLUID VALVE

Keith D. Bittle, Harrisburg, Pa.

Application October 5, 1932, Serial No. 636,316

9 Claims. (Cl. 251—18)

The present invention relates to valves for the dispensing of fluids, and more particularly to valves which permit the dispensing of fluid properly and thoroughly mixed at the point of delivery.

It is well known that the mixing valves now in general use are bulky, awkward devices, which do not mix the fluids thoroughly, and, as demonstrated by the mixing valves now commonly used for hot and cold water, do not accomplish an even flow or adequate adjustment of the mixing of the fluids.

Among the objects of this invention is to provide a valve which by easy manual manipulation will properly mix and deliver fluids from a plurality of sources.

Another object of this invention is to provide a mixing valve capable of mixing fluids from a plurality of sources to any fineness of adjustment which may be desired.

Another object is to combine with this fineness of adjustment the simultaneous control of the volume of liquids discharged, the maximum flow being unvaried.

A further object is to provide a mixing valve capable of receiving and mixing fluids from a plurality of sources and which may deliver the thoroughly mixed fluids or any one of the fluids alone or any combination of them all, at the same pressure.

Still another object is the production of a mixing valve which efficiently mixes fluids from a plurality of sources and which is as cheap to make commercially as the ordinary single delivery valve now in use and also one which is readily taken apart for adjustment or replacement of parts.

Further objects are to provide a construction of minimum simplicity, efficiency, economy and ease of assembly and such further objects, advantages and capabilities as will later more fully appear and are inherently possessed thereby.

It is obvious that this invention is particularly adapted for hot and cold water, but this is only one of many practical uses. The invention further resides in the combination, construction and arrangement of parts illustrated in the accompanying drawing, and while there is shown therein a preferred embodiment, it is to be understood that the same is susceptible of modification and change and comprehends other details and constructions without departing from the spirit of the invention.

Referring now to the drawing—

Fig. 1 is a perspective view of the mixing valve.

Fig. 2 is a longitudinal vertical cross-section of the valve with the operating handle or control lever, spring and orifice control shown in elevation.

Fig. 3 is a latitudinal vertical cross-section of the valve.

Fig. 4 is a plan view of the base or supply head showing various positions of the orifice control.

Referring more specifically to the disclosure in the drawing, the novel construction of the valve 10 1 is shown in Fig. 2 as formed of a shell or intermediate member 2 provided with an outlet 3. To the upper portion of this shell or intermediate member 2 is mounted a closure member 4 which forms the seat or socket for the arcuate member 15 5, which is flattened at the top and bottom. Through this arcuate member 5 passes the handle or control lever 6 by which and through manual operation thereof any desired degree of mixture of the fluids or any one of the fluids singly may 20 be obtained. Movement of the handle or control lever 6 may be had in any direction, subject to the limitation of movement by the closure member 4. The inside end of the handle or control lever 6 is adapted to receive a valve member 7. 25 This said valve member 7 is provided with peripheral or annular flanges 8 and 9. A tension spring is seated on one surface of said valve member 7 and is prevented from lateral slipping or expansion by the said peripheral or annular flange 30 8. This said spring 10 is made of any suitable non-corrosive material and seats at its upper end against the inner flattened surface of the arcuate member 5. To this valve member 7 is attached by crimping said peripheral or annular 35 flange 9, or by any other suitable means, an orifice control 11, one surface of which is curved or convex to engage in fluid tight contact with the dished or concaved surface or seat of the base or supply head 12. This base or supply head 12 40 carries two or more inlets 13 which supply the fluids to the valve.

The orifice control 11 is made from any suitable material which is not corrosive and which will give a fluid tight contact with a minimum of wear, 45 and it should be of a sufficient size as to completely cover the openings of the inlets 13 when in off position, such as is shown in Fig. 3. The spring 10 is of sufficient strength to resist the pressure of the liquids in the inlets 13 and to aid the liquid 50 tight contact of the orifice control 11.

As to the operation of the valve 1, the liquids to be used are introduced from a source of supply into inlets 13 of the supply head 12. When the control lever is moved to any position other 55 than that shown in Fig. 3, which is the off position, the fluid or fluids to be mixed are released into the mixing chamber 14. The fluids being under pressure are forced outwardly toward the cap member 5, and against the walls of shell 2, causing a thorough and complete mixing before release into the outlet 3 although some mixing may continue during the passage of the fluids from the mixing chamber 14 through the outlet 3. Fig. 4 further demonstrates the ease of adjustment of this valve. The position A is the off position also shown in Fig. 3. In position B only one of the supply inlets is open, consequently only one kind of fluid is being released. Position C shows each of the supply inlets half open for delivery and mixing in the mixing chamber. In position D one of the supply inlets is almost fully opening and the other is almost completely off. Any degree or fineness of adjustment from the extreme of full on of any one of the supply inlets to full off can be had by manual movement of the handle or control lever 6 which has movement in all directions, the fluids being supplied always at the same pressure.

Having thus disclosed my invention,
I claim:

1. A valve construction comprising a base having a spherically concave seat provided with a plurality of fluid inlets, a valve member having a spherically convex surface for controlling the discharge from said inlets, and a handle connected to said member for moving the same into closed or various positions of discharge, said handle being pivotally mounted intermediate its length, said valve being adapted to open and close said inlets either individually or together.

2. A sectional valve construction comprising a base member, a spherically concave seat on said member provided with a plurality of fluid inlets, an intermediate member mounted on said base and provided with a mixing chamber and discharge nozzle, and a closure member mounted on said intermediate member and provided with a universally pivotally arranged handle having a valve for controlling the discharge from said fluid inlets.

3. A valve construction comprising a base, said base having a spherical concave seat provided with a plurality of fluid inlets, an intermediate member threadably attached thereto and provided wtih a mixing chamber and outlet, a closure member threadably attached to said intermediate member and including an arcuate member provided with a handle and valve member adapted to be moved into various positions for completely or partially opening or closing one or all of said inlets, and tension means for retaining said valve member in its adjusted position.

4. In a valve construction, a base member, a spherically concave seat for said member provided with a plurality of fluid inlets, and a universally mounted valve member adapted to control the discharge from said inlets, said valve member being formed with a spherically convex surface complementary to said seat and providing a contacting engagement throughout the limit of movement of the valve member.

5. A valve structure comprising a mixing chamber, an outlet and inlets therefor, and movable control means for said chamber, said means having a spherically convex surface and a universal mounting and being adapted to close one or all of said inlets to all degrees, said mounting providing a complete closure for one side of said chamber.

6. A mixing chamber having an outlet and a spherically concave base having a plurality of inlets, a movable spherically convex closure for said inlets and adapted to selectively and simultaneously control each inlet, a movable closure for one entire side of said chamber, and a handle passing through said second closure and attached to said first closure for moving the same.

7. A valve construction comprising a mixing chamber, an outlet therefor one side of said chamber being spherically concave, said side being provided with a plurality of inlets, a movable closure for said inlets, a removable cap for the opposite side of said chamber, a closure for said cap, and a handle extending through said last mentioned closure and attached to said first mentioned closure and adapted to move said first mentioned closure so as to open one or all of said inlets to all degrees.

8. A mixing chamber, an outlet therefor, a plurality of inlets on one side of said chamber, said side being spherically concave, a spherically convex closure for said side and adapted to close one or all of said inlets to all degrees, a removable cap comprising the opposite side of said chamber, a movable substantially semi-spherical closure for said cap and having a central passage therethrough, a handle slidingly passing through said second closure and engaging said first closure so as to move the same, and a spring between said closure members and around said handle and adapted to keep said closure members in tight engagement with their respective sides.

9. A valve construction comprising a mixing chamber, an outlet therefor, one side of said chamber being spherically concaved, said side being provided with a plurality of inlets, a movable closure for said inlets, said closure being spherically convex and complementary to said side of said chamber, a removable cap for the opposite side of said chamber and a handle adapted to move said cap and said closure so as to open one or all of said inlets to all degrees.

KEITH D. BITTLE.